Patented Nov. 18, 1924.

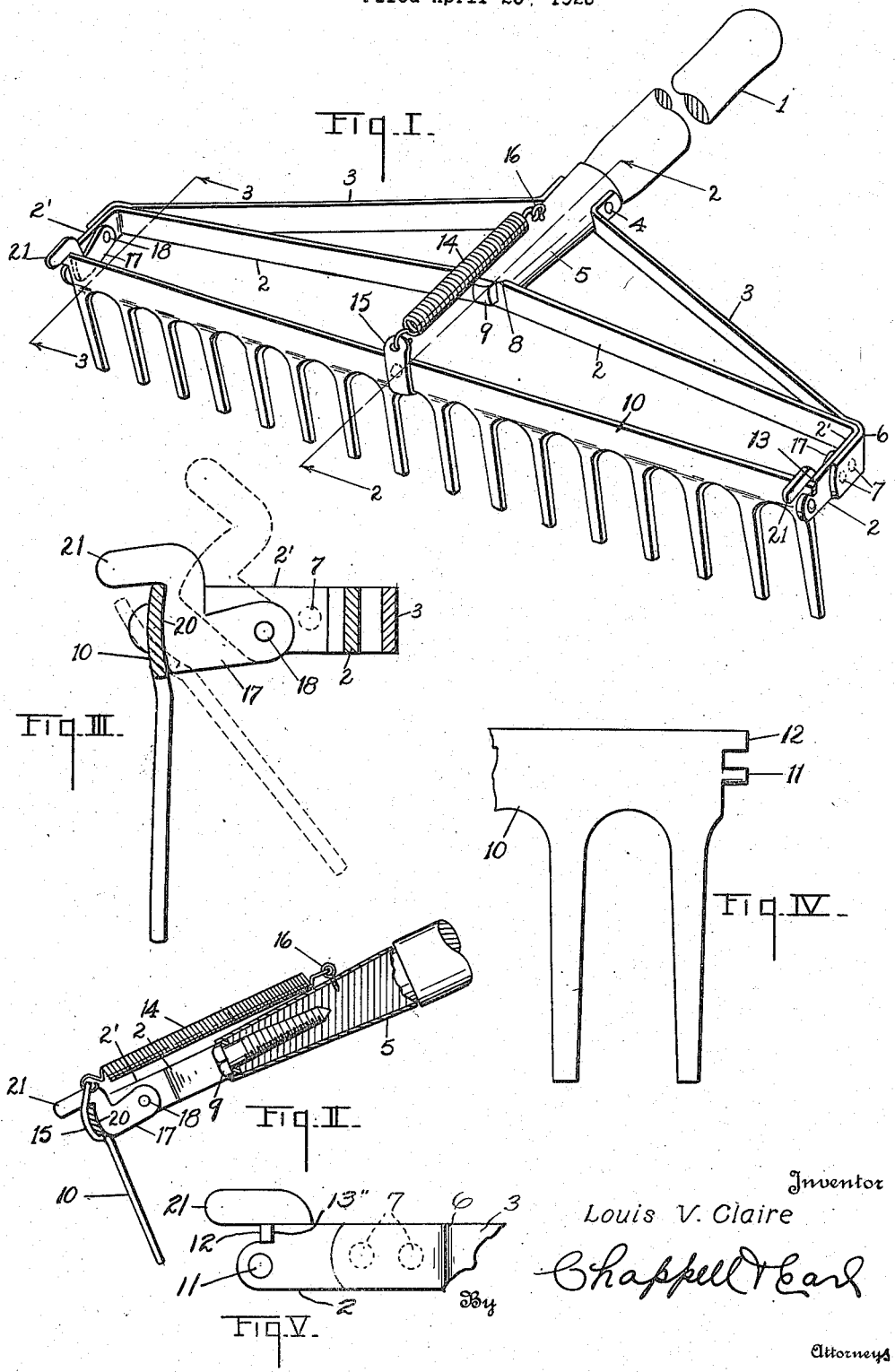

1,515,927

UNITED STATES PATENT OFFICE.

LOUIS V. CLAIRE, OF GRAND RAPIDS, MICHIGAN, ASSIGNOR OF SEVEN-SIXTEENTHS TO HARMON C. WOLFE, THREE-SIXTEENTHS TO LEWIS H. CHAMBERLIN, ONE-SIXTEENTH TO WILLIAM H. LENNON, ONE-SIXTEENTH TO CASPER M. DROSTE, AND ONE THIRTY-SECOND TO CHARLES H. BULL, ALL OF GRAND RAPIDS, MICHIGAN.

RAKE.

Application filed April 23, 1923. Serial No. 634,006.

*To all whom it may concern:*

Be it known that I, LOUIS V. CLAIRE, a citizen of the United States, residing at Grand Rapids, county of Kent, State of Michigan, have invented certain new and useful Improvements in Rakes, of which the following is a specification.

This invention relates to improvements in rakes.

The main objects of this invention are:

First, to provide an improved rake which is adapted either for lawn or garden use, the rake head being pivotally mounted and provided with a supporting spring so that the teeth of the rake may be cleaned by pushing the rake backward upon the ground, means being provided for locking the rake head in erected position, thereby adapting the rake for use as an ordinary garden rake.

Second, to provide a rake having these advantages which is light in weight and at the same time is very strong and rigid, and when the rake head is locked in erected position is rigidly supported against movement on its pivots so that it is capable of withstanding severe strains.

Third, to provide a rake having these advantages in which the head is quickly locked in erected position or freed by pivotal movement.

Objects pertaining to details and economies of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a perspective view of my improved rake, the handle being partially broken away.

Fig. II is a detail view, partially in section, on a line corresponding to line 2—2 of Fig. I.

Fig. III is a vertical section on a line corresponding to line 3—3 of Fig. I, the head locking member being shown in locking position by full lines and in disengaged position by dotted lines.

Fig. IV is a fragmentary elevation of the rake head.

Fig. V is a fragmentary end elevation of the rake with the head erected and locked in erected position.

In the drawing the sectional views are taken looking in the direction of the little arrows at the ends of the section lines and similar numerals of reference indicate similar parts throughout the several views.

Referring to the drawing, the handle 1 is provided with a yoke-like shank consisting of the bar-like member 2 having forwardly turned parallel arms 2' at the ends thereof. This is braced by the diverging braces 3 which are secured to the handle by the rivet 4 disposed through a ferrule 5, the braces being angled at 6 to embrace the angles of the member 2 and overlapped upon and secured to the arms 2' by spot welding as at 7. This forms a very rigid and at the same time a comparatively light shank which is effectively secured to the handle, the member 2 being disposed through a notch 8 in the end of the ferrule 5 and secured therein by the screw 9.

A rake head 10 is preferably formed as a stamping, the bar portion of the head being of curved cross section as shown in Fig. III, thereby adding to its rigidity. The pivots 11 are formed on the ends of the rake head to engage the arms of the shank. The rake head is provided with stops 12 above the rivet which overhang the arms of the shank and coact with the shoulder-like stops 13 thereon, the stops being in engagement when the rake head is in its erected position. The rake head is yieldingly held in its erected position with these stops in engagement by means of the spring 14, one end of which is connected to the upwardly projecting arm 15 on the rake head and the other to the screw eye 16 on the ferrule 5.

To rigidly lock the rake head in erected position I provide the locking members 17 which are pivoted at 18 on the inner sides of the arms of the shank and have curved faces 20 adapted to swing downwardly into engagement with the curved faces of the rake head engaging the same at points above and below the pivots 11, securely locking the head in its erected position and against pivotal movement, the swinging movement of the head on its pivots allowing the locking members to closely engage the same.

The locking members are provided with finger pieces 21 for convenience in manipulation.

With the parts thus arranged I provide a rake which may be used as a lawn rake or the like, the head when the locking members are released being free to swing forwardly against the tension of the spring 14, so that by pushing the rake backwardly along the ground any leaves, grass or other material is disengaged, the spring and a backward pull on the rake returning the head to its erected position. In garden or other work it is desirable to have the head securely held in erected position and this I accomplish by means of the locking member 17.

My improved rake is very simple and economical in its parts, is comparatively light in weight, and at the same time is very strong and rigid.

Having thus described my invention what I claim as new and desire to secure by Letters Patent is:

1. In a rake, the combination with a handle provided with a yoke-like shank, a rake head journaled in the arms of said shank, said head and shank having coacting stops engaging when the head is in erected position, a spring acting to normally hold said head in erected position with said stops in engagement, and a locking member pivotally mounted on said yoke to swing downwardly into engagement with the inner side of said head and when in locking position to engage the same above and below the plane of its pivots, said head and locking members having curved co-engaging surfaces.

2. In a rake, the combination with a handle provided with a yoke-like shank, a rake head journaled in the arms of said shank, said head and shank having coacting stops engaging when the head is in erected position, a spring acting to normally hold said head in erected position with said stops in engagement, and a locking member pivotally mounted on said yoke to swing downwardly into engagement with the inner side of said head and when in locking position to engage the same above and below the plane of its pivots.

3. A rake comprising a handle having a yoke-like shank, a rake head comprising a head bar disposed between the arms of said shank and having end pivots journaled therein, a stop limiting the rotation of said head in one direction, a spring acting to normally hold said head against the stop, and a locking member pivotally mounted on the inner side of one of the arms of said shank to swing downwardly into engagement with the inner side of said head bar preventing its pivotal movement.

In witness whereof, I have hereunto set my hand.

LOUIS V. CLAIRE. [L. S.]